3,330,704
REFRACTORY COATINGS FOR METAL SURFACES

Alan S. Michaels, Lexington, Mass., assignor to Amicon Corporation, Cambridge, Mass., a corporation of Massachusetts
No Drawing. Filed Oct. 21, 1965, Ser. No. 500,280
14 Claims. (Cl. 148—6.2)

This application is a continuation in part of copending applications Ser. No. 233,131 filed Oct. 25, 1962 now abandoned and 374,834 filed June 12, 1964.

This invention relates to a refractory metal product having on its surface an adherent fired refractory coating and to a method for making the same.

Refractory metals such as columbium, nickel, and their alloys with each other and with other metals such as chromium, iron, tungsten, molybdenum or titanium are of considerable importance because of their ability to withstand temperatures as high as 2500° F. or even more without melting. However, their use has been limited by their susceptibility to oxidation at elevated temperatures.

I have found that the utility of such refractory metals can be greatly increased and extended by providing on the surface of the metal an oxidation-resistant refractory coating which is highly adherent to the metal surface. Although the application of fused glass-like ceramic coatings to a variety of metals is well known, the coatings previously known have been relatively ineffective to protect the underlying metal from oxidation at high temperatures.

One object of the present invention is to provide a refractory metal product having on its surface an adherent fired refractory coating which is resistant to oxidation at elevated temperatures and which also possesses the desirable qualities of resilience and resistance to abrasion.

Another object is to provide a simple and inexpensive method of making such a coated metal product.

I have found that the foregoing objects are attained by coating the metal surface with an aqueous slurry containing a mixture of a finely divided silicon-containing material, certain hexavalent chromium compounds, and the oxides of certain metals which from low melting silicate glasses, and firing the mixture in situ on the metal. If desired, the last ingredient may be chemically combined with the hexavalent chromium compound before firing.

While the precise nature of the chemical reactions which occur in the mixture are not fully understood, it is believed that some interaction occurs between the hexavalent chromium compound (such as chromium trioxide) and the metal oxide in the aqueous phase before firing, as evidenced by an increase in pH as well as an increase in viscosity of the slurry upon standing at room temperature. It is believed that a further reaction occurs during the firing step during which some of the chromium trioxide reacts with the underlying refractory metal surface to provide an adherent bond between the metal and the coating, and some low melting metal silicate glasses are formed which serve as a reaction medium for the chromium trioxide. However, applicant does not wish to be bound by these theories of operation.

The silicon-containing material includes as an essential ingredient a silicate mineral in finely divided form, preferably an alumino-silicate or a magnesium silicate such as kaolin, talc, pyrophyllite, precipitated magnesium silicate, or the like, or mixtures of these materials with each other. Mixtures of such silicate minerals with silica or boron oxide or with low melting metal silicate glasses such as the borosilicates or the silicates of any of the metals lead, zinc, barium, lithium or manganese, or mixtures thereof may also be used. In the event that the silicon-containing material is composed of such a mixture of other materials, with silicate mineral, the finely divided silicate mineral must be the major ingredient, amounting to at least 70% of the total weight of silicon-containing material. While the particle size of silicon-containing material is not critical it must be small enough to permit the material to form a reasonably homogenous mixture with the other ingredients and to permit it to be applied in the form of an aqueous slurry as a coating on the surface of the metal. It is also important that the particle size of the silicate mineral be sufficiently small so that the desired chemical interaction of the ingredients can readily occur during a reasonably short period of time in the firing step. In general, particle sizes varying from 0.1 to 50 microns have been found satisfactory.

The hexavalent chromium compound, the second essential ingredient of the mixture to be fired, is believed to interact chemically not only with the remaining ingredients of the mixture but also with one or more of the components of the refractory metal or alloy on which the coating is applied, thus providing strong adherence of the coating to the metal surface. Adhesion is particularly strong to surfaces of metals or alloys containing at least 10% by weight of one or more metals which are good oxygen getters, such as chromium, titanium, tungsten, molybdenum, or columbium; less strong adhension is obtained on the surface of such metals as wrought nickel. The hexavalent chromium compound may be in the form of chromium trioxide (chromic acid anhydride), including incompetely dehydrated chromic acid, or it may be in the form of a chromate or dichromate which decomposes on heating to form chromium trioxide, such as ammonium chromate or ammonium dichromate. Furthermore, the chromium trioxide may be chemically combined with the third essential ingredient of the mixture, the metal oxide, before mixing and firing, in which case it may be in the form of a chromate or dichromate of the metals lead, zinc, barium, lithium or manganese, or mixtures thereof. The amount of hexavalent chromium compound in the mixture may vary from 10% to 50% of the total weight of the dry mixture.

The third essential ingredient of the mixture to be fired is a metal compound, the metal being one which forms a low melting silicate glass, such as lead, zinc, barium, boron, lithium or manganese, or mixtures thereof. The compound may be an oxide or any other compound of the metal which decomposes to form an oxide when subjected to calcination conditions, such as a hydroxide, nitrate, carbonate, or halide, e.g., chloride, bromide or iodide. As pointed out above, the metal compound, for example the metal oxide, may be chemically combined with the hexavalent chromium compound and introduced into the mixture in the form of a metal chromate or dichromate. These chromates and dichromates decompose when heated at temperatures up to 2000° F. to produce both chromium trioxide and the metal oxide. If desired, all of the metal compound may be introduced in the form of a chromate or dichromate, or some or all of the metal may be introduced in the form of an oxide, hydroxide, nitrate, carbonate or halide. If oxides of two or more different metals are employed, they may in some cases be chemically combined with each other before introduction into the mixture, as for example in the case of lithium borate. A portion but usually not all of the desired metal may also be introduced in the form of the metal silicate. No matter in what form the metal is introduced into the mixture, the total quantity of oxide-equivalent of the metal in the mixture should be from 2% to 35% by weight of the total dry mixture.

In addition to the foregoing ingredients, it has been found desirable in many cases, in order to obtain optimum results, to include in the mixture to be fired an additional ingredient which is a refractory metal oxide which neither melts nor decomposes when heated to temperatures up to 2500° F., which does not form a low melting silicate glass, and which is capable of participating in spinel lattices of valences +2, +3, or +4. These refractory metal oxides may be introduced into the mixture either as such or in the form of the corresponding hydroxides, which are converted into the oxides before or during the firing step. The oxides and hydroxides which have been found most satisfactory are those of nickel, magnesium, iron, yttrium, aluminum, trivalent chromium, columbium, titanium, zirconium, hafnium, or thorium. It is preferable to add the oxides and hydroxides of these metals with the metal in that valence state which is most stable at elevated temperatures, e.g. as $Fe^{+3}$, $Ni^{+2}$ or $Ti^{+4}$ rather than as $Fe^{+2}$, $Ni^{+3}$ or $Ti^{+3}$. These refractory metal oxides may be used in amounts up to 40% by weight of the dry mixture. The introduction of these refractory metal oxides into the composition serves to increase the softening point of the fired coating and increases the range of temperatures within which the coating is useful. Although a small quantity of the refractory metal oxide has an appreciable effect, the preferred range of proportions is from 5% to 40% of the total weight of the dry mixture.

The mixture may be prepared simply by mixing together the several ingredients in dry solid finely divided form. While the particle size of the several ingredients is not critical, and they may all have a particle size of the same order of magnitude as that of the silicate mineral, preferably the remaining ingredients have an average particle size considerably smaller than that of the silicate mineral. Mixtures having very small particles of metal oxides or hydroxides may conveniently be prepared, for example, by first making a slurry of the finely divided silicate mineral particles in water, then precipitating in the slurry the hydroxide of the desired metal or metals (e.g., lead hydroxide, titanium hydroxide, nickel hydroxide, etc.). When the mixture is prepared in an aqueous slurry, preferably the hexavalent chromium compound is the last ingredient added to the aqueous mixture. When prepared as a dry mix, the order of mixing is of no consequence. The slurry is then washed to remove any residual dissolved electrolytes, dried, and heated to a temperature of the order of 1200° to 1500° F. to remove bound water, to fuse any low melting ingredients, such as lead silicate, and to calcine the mineral particles.

In any event, regardless of how the mixture is prepared, it is mixed with water to form a paste or viscous liquid for application to the metal surface by spraying, brushing, dipping, spreading or any other conventional procedure. In order to minimize the time required in preparing the mixture, it is usually desirable to avoid including any water soluble ingredients in the solid mix, simply dissolving them in the desired proportions in the final aqueous slurry.

After the composition has been coated on the desired refractory metal surface, such as stainless steel, it is dried and then fired at a temperature from 1500° to 2500° F. to form a smooth, coherent, glass-like coating. This usually requires a minimum of fifteen minutes at the desired firing temperature. For optimum results and best adherence to the refractory metal surface, longer heating times at the firing temperature, up to two hours, are preferred. It is desirable that the coated metal, during heating to the firing temperature, be heated fairly rapidly to the minimum firing temperature of 1500° F. in order to avoid excessive thermal decomposition of the hexavalent chromium compound before it has had an opportunity to react with the underlying metal.

The following specific examples are intended to illustrate more clearly the nature of the present invention without acting as a limitation upon the scope thereof.

EXAMPLE 1

An aqueous dispersion is first prepared by mixing 100 g. of kaolin with 1000 cc. of water, and then adding, while stirring, sufficient aqueous ammonia (Reagent grade) to bring the pH to about 6.5.

The clay suspension is now agitated strongly, as in a Waring Blendor (low setting) and to it are added a concentrated aqueous solution containing 40 g. of lead nitrate and a concentrated aqueous solution containing 12 g. of chromium trioxide. Each solution is added slowly, a drop at a time, the lead nitrate being started first followed by the chromium trioxide. During the addition of these solutions a slight excess of lead nitrate is maintained. The pH may be allowed to drop to between 4.0 and 4.5, at which point additional aqueous ammonia is added to bring it again to 6.5.

After all of the lead nitrate and chromium trioxide have been added, the mixture is filtered under vacuum and washed with distilled water, and the filter cake, which consists of kaolin coated with lead chromate, is dried at 110° C., and is then pulverized.

A coating composition is next formed by adding sufficient water to the dried, pulverized solid to form a thick paste, to which is added a small amount, 0.1% of the weight of the solid, of a dispersing agent such as ammonium hydroxide. This suspension is mixed to produce a coatable composition, which will typically contain about 10% to about 70% of suspended solids by weight.

To form a protective coating, the surface to be treated such as stainless steel, is thoroughly cleaned and passivated in concentrated nitric acid and is then coated with the kaolin-lead chromate suspension. Coating may be carried out by any conventional technique such as dipping, spraying, brushing, or electrodeposition. The amount of coating preferably should be sufficient to provide a final fired coating having a thickness between 0.0005 and 0.010 inch. The coated surface is now dried at low temperature (below 100° C.) until all the free water has been removed and is then fired to a temperature between 1600° F. and 1900° F., preferably for a period greater than fifteen minutes.

The precise temperature and time of firing should be sufficient to dehydrate the silicate mineral and to cause the coating to fuse, at least partially, to form a continuous film on the metal surface. In addition, the firing temperature should exceed the highest temperature that the article will be exposed to in service.

After fusion, the article is allowed to cool, and may then be brushed, dusted or buffed to remove any loosely adhering coating composition.

The coating composition described above is well-suited for use on refractory metals, typically iron-chromium-nickel alloys and other ferrous alloys. Tests conducted on samples of S.A.E. 304 Stainless Steel held at a temperature of 1750° F. for thirty hours and then 1400° F. for one hundred twenty hours resulted in no increase in the weight of the steel during the entire period. Untreated samples of the same steel increased in weight by over 50% due to oxide formation.

Modifications of the procedural steps and ingredients of this example may be made. In forming the lead chromate, for instance, all of the lead salt may be added first, preferably while maintaining the slurry at a pH between 7 and 9, and thereafter adding the cromium trioxide solution. In this manner a deposit of lead hydroxide is first formed on the clay surface; this reacts with the chromium trioxide to produce the desired lead chromate. Equally satisfactory results are not, however, obtained by adding the chromium trioxide before adding the lead nitrate solution, since this order of addition has been found to produce relatively large, needle-like lead chromate crystals (ca. 30 microns long) which produce a less uniform mixture of lead chromate and kaolin in the final coating composition. While in some cases it is believed that the chromate particles may form a coating on the surface of the particles of silicate mineral, this is not essential. The important factor is to provide a mixture of the two materials which is as uniform as possible.

Alternatively, it has been found possible to produce a completely satisfactory coating by adding the lead nitrate solution to the kaolin, precipitating the lead as lead hydroxide by adding ammonium hydroxide until the pH is raised to between 7 and 9, and then filtering, washing and drying the precipitate as before. The white powder so produced may later be blended with water and with that quantity of chromium trioxide which is stoichiometrically required to form lead chromate, i.e. the Pb (as PbO) to $CrO_3$ ratio should be 2.23 to 1.

Although the ratio of $CrO_3$ to PbO should never be less than 1:2.23 in the procedure of this example in which a metal chromate is formed in situ, it has been found beneficial to employ ratios of $CrO_3$ to PbO which are higher than the stoichiometric amount. While the amount of such excess $CrO_3$ is not critical, as little as 5% having been found to be effective, improved oxidation protection at temperatures above 1800° F. has been obtained by employing 50% to 150% in excess of the amount of $CrO_3$ which is stoichiometrically equivalent to the lead. When the metal chromate is not formed in situ, lesser amounts of hexavalent chromium compound may be used.

EXAMPLE 2

There were stirred into 300 ml. of distilled water in a 600 ml. Waring Blendor jar 40 g. of kaolin (Strumax, Georgia Kaolin Company). With continued good agitation of the mix, 30 g. of titanium tetrachloride were stirred into the slurry, leading to the evolution of hydrogen chloride fumes. There were then dissolved in the slurry 24 g. of lead nitrate, and sufficient ammonium hydroxide was added to increase the pH to approximately 7.0. The slurry was then filtered, the solids washed with water to remove dissolved electrolytes, and heated to 1000° F. for one hour to remove moisture, then crushed to a fine white powder. The powder was mixed with water to form a paste containing about 30% solids, and 27 g. of chromium trioxide (chromic acid anhydride) were dissolved in the paste, converting it to a yellow, free-flowing slurry.

Coupons of nickel alloys containing minor proportions of chromium and iron (Inconel and Inconel X, International Nickel Company) measuring one inch by two and having a gauge of 30 mils were coated with the slurry by dipping (or spraying) and allowed to dry in air at room temperature. The coated coupons were then fired by inserting into a hot oven at 2300° F., maintaining them exposed to air at temperature for two hours, and then slowly cooling to room temperature. The finished metal product carried a tough, flexible, adherent green coating, approximately one mil in thickness, which remained undamaged after repeated rapid thermal cycling between 2200° F. and room temperature. The coating was highly effective in protecting the surface of the metal against oxidation at elevated temperatures as shown by the fact that the coated coupons, after exposure to air at 2200° F. for sixty-four hours, gained an average of less than one mg. per square inch in weight, while uncoated coupons of the same metal gained over 30 mg. per square inch under the same conditions. The composition of the coating after firing was estimated to be about 40% by weight calcined kaolin ($Al_2O_3 \cdot 2SiO_2$), 23% $Cr_2O_3$, 22% PbO, and 15% $TiO_2$.

When a trivalent chromium compound, such as chromic nitrate, was substituted for the hexavalent chromium compound in the foregoing example, the finished coating was unsatisfactory, being much inferior in vitrification, cohesion, adhesion, and inability to protect the metal from oxidation. Analysis of X-ray diffraction patterns taken on powdered samples from such coatings indicated that the principal crystalline phases present were mullite, rutile titania and chromic oxide. With the hexavalent chromium present, however, as in this example, the coatings after firing are still highly crystalline, but mullite and rutile titania were found to be present in much smaller quantities and, in fact, the patterns do not correspond to any of the common aluminum, titanium or chromium oxides. Electron beam probe data, obtained on coupons of Inconel X which had been coated and fired as in the example above, showed a surprisingly high content of chromium and titanium to be present in a thin (ca. 0.1 mil thick) interfacial zone between the coating and the base metal. The chromium content was found to increase from approximately 16 atomic percent in the base metal to a peak value of 33 atomic percent in this interfacial zone, while the titanium also was found to increase from less than 1% in the base metal to a peak value of over 4% in this zone.

EXAMPLE 3

The procedure of Example 2 was repeated except that the divalent lead compound (lead nitrate) was replaced by a tetravalent lead compound prepared by dissolving $PbO_2$ in a dilute solution of nitric acid and hydrogen peroxide. This solution was used in place of the lead nitrate of Example 2, the number of mols of lead being the same in both cases. The continued presence of tetravalent lead could be verified because of the dark brown color of the lead tetrahydroxide present in contrast to the white color of lead dihydroxide. Inasmuch as tetravalent lead does not form an insoluble chromate, the use of tetravalent lead serves to prevent the formation of large lead chromate crystals after the coatings have been applied and dried. Upon heating above 600° F., however, the $PbO_2$ decomposes to yield PbO which is believed to be more uniformly distributed with respect to the kaolin particles than in those cases in which PbO was the initial starting material. This belief is supported by the observation that coatings prepared in accordance with the example were found to be even more effective than those of Example 2 in protecting against air oxidation coupons of Inconel and Inconel X at a temperature of 2300° F. The composition was also coated on a coupon of a columbium alloy containing a minor proportion of tungsten and fired for three hours at 2400° F. in an atmosphere of argon. The finished coating was found to provide excellent protection for the columbium alloy against oxidation at 2200° F.

EXAMPLE 4

An aqueous slurry was prepared by dispersing 40 g. of kaolin in 300 ml. of aqueous solution containing 26 g. of lead nitrate and 25 g. of cobalt nitrate. A sodium hydroxide solution was added to this slurry with stirring to increase the pH to 7.0 causing lead hydroxide and cobalt hydroxide to precipitate on the kaolin particles. The mixture was filtered, washed, dried, and powdered. One part by weight of this dry powder was then mixed with three parts by weight of water and 0.5 part by weight of chromium trioxide to form a slurry. Coupons of Inconel and Inconel X were dip-coated with the slurry, allowed to dry in air at room temperature, then fired by heating for two hours at 2300° F. to form a finished refractory metal product having on its surface a tough, strongly adherent, flexible refractory coating sufficient to provide protection against oxidation for approximately one hundred hours at 2200° F. in air.

EXAMPLE 5

An aqueous slurry was prepared as described in Example 4 except that magnesium nitrate was substituted for the cobalt nitrate and boric oxide was dissolved in the aqueous slurry along with the chromium trioxide, the proportions being adjusted so that the final dry coating, before firing, contained 35% by weight of kaolin, 13% lead monoxide, 17.4% chromium trioxide, 13% magnesium oxide and 21.6% boric oxide. The resulting dispersion was employed to dip-coat a coupon of wrought nickel and also a coupon of nickel reinforced with a dispersion of thoria (TD Nickel, DuPont).

After firing at 2200° F. for thirty minutes satisfactory refractory metal products were obtained. The coatings were found to be tough and strongly adherent to the underlying metal and were found to be effective to protect the metal against oxidation in air at temperatures of 2000° F. for as much as forty hours.

EXAMPLE 6

Three parts by weight of pyrophyllite (MM-1 grade, 325 mesh, Mauna Mining Corp.) were dry mixed in a porcelain crucible with one part by weight of boric oxide and 0.75 part by weight of lead monoxide. The mixture was then heated at 1300° F. for ten minutes to melt the boric oxide and distribute it more uniformly with respect to the remaining constituents. The white powder which resulted was mixed with 1.25 parts by weight of chromium trioxide, and with seven parts by weight of water to produce a slurry which was sprayed on coupons of nickel reinforced with thoria (TD Nickel). The coated metal was dried in air at room temperature, then heated in an air over at 2100° F. for one-half hour. The resulting product exhibited a protective refractory coating which was tough and adherent to the metal substrate and which provided effective protection of the metal against oxidation in air at 2000° F. for a period greater than one hundred hours. In addition, the coated metal product withstood successfully repeated, rapid thermal cycling from room temperature to 2000° F.

EXAMPLE 7

The procedure described in Example 6 was repeated except that the pyrophyllite was replaced with an equal amount of talc (Nytal, R. T. Vanderbilt Company, average particle size 7 microns). The resulting slurry was used to coat wrought nickel, TD Nickel, Inconel and Inconel X, the coatings being fired in air at 2000° F. for thirty minutes in each case. The finished coatings, which were from 2 to 5 mils thick, provided effective protection against oxidation of the metal in air at 2000° F. for periods of time of the order of sixty hours.

EXAMPLE 8

The procedure described in Example 6 was repeated except that there were substituted for the pyrophyllite three parts by weight magnesium silicate (U.S.P. grade). The resulting slurry was coated on a variety of metals as described in Example 7 and the coated metals were fired at 2300° F. in air for one hour. The finished products possessed the same general characteristics as those in Example 7.

EXAMPLE 9

An aqueous slurry was prepared containing twelve parts by weight of magnesium silicate (U.S.P. grade), four parts of lithium silicate (ground to pass 325 mesh), and eight parts of chromium trioxide in fifty parts of water. Coupons of TD Nickel were coated with the slurry by spraying, dried in air at 100° C., then fired in air at 2300° F. for fifteen minutes. The finished products possessed the same general characteristics as those of Example 7.

The coatings described in Examples 6, 7, 8 and 9 were found, by microscopic examination of the interfacial zone between coating and substrate, and by the results of repeated thermal cycling tests, to adhere more strongly to Inconel X than to wrought nickel or TD Nickel.

EXAMPLE 10

Two parts by weight of magnesium silicate (U.S.P. grade) were dispersed in an aqueous solution containing 1.94 parts by weight of nickel nitrate hexahydrate. A 5% by weight aqueous solution of lithium hydroxide was then stirred into the solution to precipitate 1.24 parts by weight of nickel hydroxide on the magnesium silicate particles. The mixture was filtered, washed, and dried at room temperature in air, then heated at 1000° F. in air for fifteen minutes to convert the nickel hydroxide to nickel oxide. Ten parts by weight of the dry solids were then mixed with ten parts by weight of chromium trioxide, four parts of lithium silicate (325 mesh), and twenty parts of water to form a slurry. Coupons of TD Nickel were spray coated with the slurry, dried at room temperature, and fired in air at 2100° F. to produce coated metal products having the same general characteristics as those of Example 9.

EXAMPLE 11

The products of Example 10 after firing to produce a coating having a thickness of approximately one mil were then coated with the composition of Example 9 and fired again at 2100° F. for ten minutes in air, the second coating having a thickness of approximately 2 mils. The double coated product successfully withstood rapid thermal cycling from room temperature to 2300° F. The coatings provided effective protection against oxidation of the underlying metal at elevated temperatures as evidenced by a weight gain which was only 25% that of uncoated TD Nickel coupons after sixty-four hours in air at 2100° F.

EXAMPLE 12

Several TD Nickel strips, 1" x ½" x 30 mils thick, were coated with a thin layer of pure chromium (ca. 0.2 mil thick) by a pack cementation, vapor diffusion, process. These coupons were then heated in a vacuum furnace to allow the chromium to diffuse into the TD Nickel, resulting in a configuration in which the chrome content at the surface had been reduced to approximately 40–50% and the depth or thickness of the chromium-rich layer had increased to about one to two mils. These coupons were then coated with the formulation used in Example 7, and were fired at a temperature of 2350° F. for one hour. An extremely tough adherent coating was formed which provided markedly better protection against oxidation for the underlying metal and markedly better adhesion, as indicated by ability to withstand repeated rapid thermal cycling from room temperature to about 2000° F., than did the coating of Example 7 on plain TD Nickel.

Although specific embodiments of the invention have been described herein, it is not intended to limit the invention solely thereto but to include all of the obvious variations and modifications within the spirit and scope of the appended claims.

What is claimed is:

1. A refractory metal product having on its surface an adherent fired-in-situ refractory coating which prior to firing consists essentially of a mixture of (1) silicon-containing material selected from the class consisting of finely divided silicate mineral, mixtures thereof with silica, mixtures thereof with boron oxide, and mixtures thereof with low-melting metal silicate glasses, (2) a hexavalent chormium compound selected from the class consisting of chromium trioxide, ammonium chromate, ammonium dichromate, and chromates and dichromates of the metals lead, zinc, barium, lithium and manganese, and mixtures thereof, (3) an amount of a compound of said metals selected from the class consisting of oxides, hydroxides, nitrates, carbonates, and halides, which amount is equal to 0% to 35% of oxide-equivalent of said metals by weight of the total and is sufficient to provide a total quantity of oxide-equivalent of said metals in the mixture from 2% to 35% by weight of the total, the amount of silicon-containing material being from 10% to 70% by weight of the total and the amount of said hexavalent chromium compound being from 10% to 50% of the total.

2. A refractory metal product as claimed in claim 1 in which said silicate mineral is selected from the class consisting of kaolin, talc and pyrophyllite.